July 11, 1939. G. W. EMMERT 2,165,357
VENT TUBE FOR FUEL TANKS
Filed Oct. 14, 1938

INVENTOR.
George W. Emmert
BY Barnes, Kisselle, Laughlin & Reisch
ATTORNEYS

Patented July 11, 1939

2,165,357

UNITED STATES PATENT OFFICE 2,165,357

VENT TUBE FOR FUEL TANKS

George W. Emmert, Bloomfield Hills, Mich.

Application October 14, 1938, Serial No. 235,049

2 Claims. (Cl. 220—86)

This invention relates to a device for venting liquid fuel tanks, and particularly liquid fuel tanks used on automotive vehicles.

Automotive vehicles of the present day, and particularly passenger vehicles, have their fuel tanks equipped with rather long filler tubes. The tank itself usually lies in a concealed position; where the fuel tank is at the rear of a passenger vehicle, the rear portion of the body and the fenders for the rear wheels overlie and conceal the tank, and the filler tube extends from the tank and usually has its inlet end extending through or adjacent to some of the rear sheet metal work, such as the rear portion of the body or a fender or the like. Some filler tubes extend through the sheet metal work; others are available through an opening provided in the sheet metal. These filler tubes are not only quite long, due, at least partially, to the fact that the rear sheet metal is extended considerably to the rear of the tank, but are provided with various bends or irregular shapes in order to be properly fitted into position.

This has resulted in a difficulty in filling the fuel tanks. The gasoline, which is the usual fuel, is pumped into the tanks in a manner well known to most everyone, and the rapid vaporization of the fuel results in trapping of the vapors within the tank. The trapped vapors may become slightly compressed, but in any event vaporization continues, with the result that the vapors, in order to escape, flow backwardly through the filler tube. This causes the entering fuel to splash back and some fuel is thereby wasted and the fuel splashed over the adjacent portions of the automobile. In addition to the waste of fuel and undesirable splashing of the fuel on the vehicle, time is lost because the gasoline cannot be pumped into the tank so fast.

The present invention has, as its principal object, the provision of a device which may be placed in the filler tube so as to define an inlet passageway for the fuel and an outlet venting passageway for the fuel vapors, together with what air is required to be vented. In accordance with the present invention, this device takes the form of a flexible tube preferably made of metal in such a way that it is flexible and arranged to be secured in position at one end, preferably the end adjacent the open end of the filler tube. Due to the fact that the device is made of flexible tubing, it may be readily inserted into and adapts itself to various shapes of filler tubes, and due to the non-rigid nature of the tube it will lie in position within the filler tube without rattling or causing any objectionable noises even though it is secured only at one end.

A device for carrying out the invention is shown in the accompanying drawing wherein.

Figure 1:
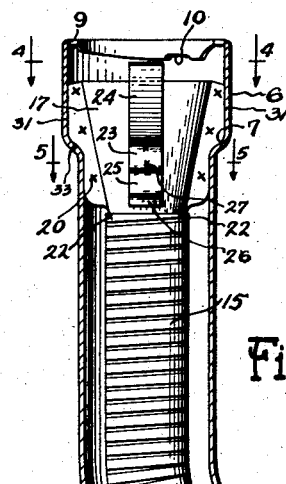
Fig. 1 is a view showing a portion of the fuel tank and the filler inlet pipe therefor and illustrating the vent tube in position.
Figure 3:
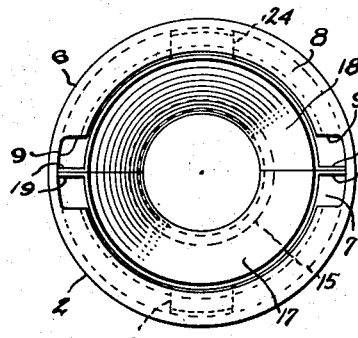
Fig. 3 is an enlarged top plan view of the filler tube with the vent tube therein.
Figure 4:
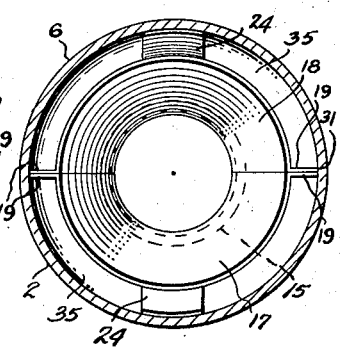
Fig. 4 is an enlarged cross sectional view taken substantially on line 4—4 of Fig. 1.
Figure 2:
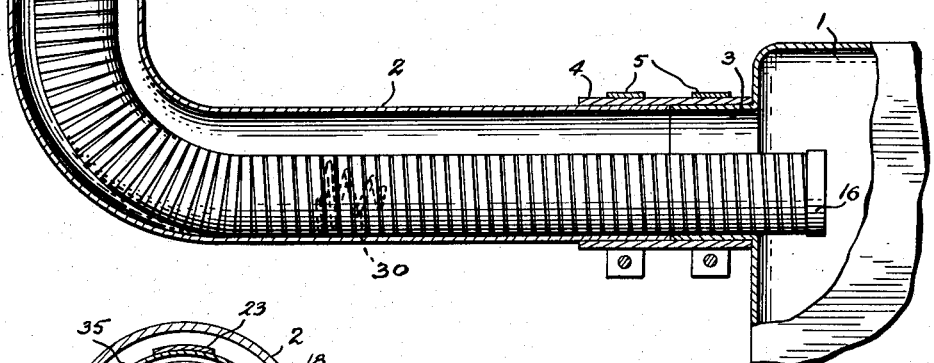
Fig. 2 is an enlarged detail of one end of the vent tube showing the arrangement for receiving the fuel and for holding the vent tube in position.
Figure 5:
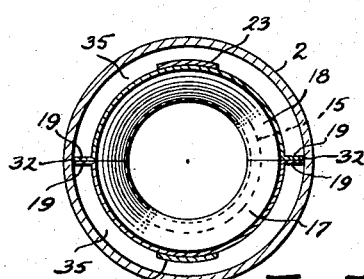
Fig. 5 is an enlarged cross sectional view taken substantially on line 5—5 of Fig. 1.

A portion of a fuel tank for an automotive vehicle is illustrated at 1 and the fuel inlet tube is generally illustrated as comprising a tube 2 separate from the tank but connected to a tubular extension 3 by means of a flexible sleeve 4 slipped over the tube 2 and extension 3 and secured by clamps 5. This is the usual arrangement on present day vehicles and provides for a measure of adjustment of and relative movement of the filler tube 2 relative to the tank. The filler tube 2 is shown herein in the form of a simple L-shape, but this is exemplary only, it being understood that the filler tube may have any desired shape. The end of the filler tube has an enlarged end 6 with an intermediate portion of a flared nature providing a shoulder 7. The top of the tube has an inwardly extending flange 8 with bayonet openings 9 for receiving the usual bayonet type cap, and the edges of the flange 8 are turned down inside the tube and shaped appropriately as illustrated at 10 for accommodating the projecting arms or fingers of the cap. The cap is not shown, as it is well known how these caps are arranged, and the structure thus far described is exemplary of the usual filler tube structures.

Figure 6:
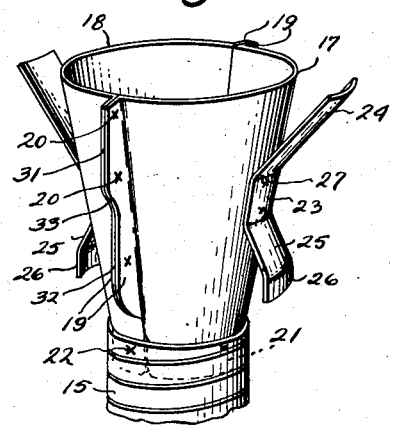
Fig. 6 is a detailed cross sectional view showing an arrangement for preventing the insertion of a siphon tube.

The vent tube has a tubular portion 15 of a flexible nature and advantageously made of a helically wound metal strip as illustrated in Fig. 6. The inner end may be provided with a suitable sheet metal terminating collar 16. The other end is equipped with an arrangement for the reception of the liquid fuel and for holding the vent tube in position. This arrangement is advantageously somewhat of a conical or funnel shape and the particular arrangement shown is fashioned from two sheet metal parts of identical formation, one being illustrated at 17 and the other at 18, each having flanges 19. The two parts are placed in opposed relationship with the flanges abutting, as illustrated, and the flanges may be spot welded together as illustrated at 20. The inner ends of the two members 17 and 18 form a portion 21, which is telescoped into the adjacent end of the flexible tube and the parts may be united by means of spot welding, as illustrated at 22.

In the form shown, two spring members are attached to the funnel structure in substantially diametrically opposite positions, and may be secured by spot welding, as shown at 27. Each spring member has an intermediate portion 23 for abutting against the funnel and an upper arm 24 which extends upwardly and outwardly, and a lower arm 25 which extends downwardly and outwardly, the extreme end of which may be flattened or placed in a plane substantially paralleling the axis of the funnel, as illustrated at 26.

Within the flexible tube a device is preferably arranged to prevent the insertion of a siphon tube. This device advantageously takes the form of a wire of spring metal wound helically into somewhat of a conical shape, as illustrated at 30. The base diameter is preferably such that the large convolutions threadedly engage the interior of the flexible tube. This makes for an easy assembly in the manufacture of the device, and the large convolution preferably is slightly compressed so that it expands outwardly, and frictionally grips the flexible tube with sufficient force to maintain the spring 30 in position.

The manner of installing the vent tube is very simple as the tube is merely inserted into the filler tube and the spring arms 24 engage under the flange 8. As shown in the drawing herein the spring arms are positioned substantially at 90° from the openings 9. The flanges 19 and 20 are shaped with a large diameter 31 and a smaller diameter 32 for respectively fitting the two corresponding diameters of the portions 6 and 2 of the filler tube. Also, the flanges have an intermediate shoulder 33 for fitting against the shoulder 7. The inner end of the vent tube preferably extends to or slightly beyond the tank wall. The portions 26 of the spring members also frictionally engage within the relatively smaller diameter of the portion 2 of the filler tube so that the funnel portion is nicely and accurately centered. The vent tube cannot normally be withdrawn. If the spring arms are lined up with the openings in the filler tube then the flanges underlie the overturned portions of the filler tube; if the flanges are lined up with the openings in the top of the filler tube, then the springs underlie the flanges on the filler tube.

With this arrangement, the vent tube is securely held in place and while it can be easily installed, it is very difficult and time consuming to remove the vent tube. Therefore, from a practical standpoint the vent tube not only serves as a vent, but serves as a lock for the fuel tank due to the presence of the device 30 which prevents the insertion of a siphon tube. Accordingly, when one equips his vehicle with this device, the fuel tank is not only effectively locked but is provided with a vent.

In use, the fuel enters the funnel portion, passes through the flexible tube and into the tank. The arrangement provides ample space around the tube for the flow of air and fuel vapors out of the tank. The flanges 19, together with the spring members, hold the funnel portion centrally of the filler tube to maintain the vent space 35. It has been found in practice that while the vent tube is of smaller diameter than the filler tube, that it has adequate capacity for passing all the fuel pumped into the tank, in view of the fact that there is no resistance or difficulty met with from a venting standpoint. As above mentioned where the fuel is passed to the tank through the filler tube, the fuel vaporizes, which vaporization is probably accentuated due to the agitation of the fuel. Even though the filler tube is of quite generous proportions, the vaporized gas will be trapped and will result in a splash back, wasting some fuel and causing loss of time, etc.

I claim:

1. A vent tube for a crooked and rigid filler pipe of a fuel tank in an automotive vehicle comprising and which filler pipe has an enlarged open end, a flexible metal tubular body, a funnel-like inlet device comprising two sheet metal stampings, each having oppositely disposed flanges, said stampings being disposed in opposing relationship with the flanges abutting each other and secured together, the small end of the funnel-like device being secured to one end of the tubular body, and spring means secured to the funnel-like device and spaced circumferentially from the flanges, the tubular-like body adapted to be passed lengthwise into a filler tube and to lie freely therein adapting itself to the shape of the filler pipe and the flanges and spring means being so formed and constructed as to engage the interior surfaces of the enlarged open end of the filler tube for securing the vent tube in position with the inlet device substantially centered in the filler tube.

2. In combination with the filler pipe of a fuel tank in an automotive vehicle having an enlarged portion at its open end defined by a shoulder spaced from the extreme end and having a bayonet type extreme end structure for the reception of a cap, of a vent tube comprising, a flexible metal body in the filler pipe, a sheet metal inlet device comprising two stampings with flanges disposed in opposed relationship and with the flanges secured together, said inlet device being of funnel shape with the smaller end secured to the flexible tubular body, said flanges having shoulders for resting upon the shoulder of the filler tube and portions for engaging the interior of the enlarged portion, and spring arms on the inlet device spaced circumferentially from the flanges and arranged to be moved past the bayonet structure on the filler pipe and to underlie an overhanging part on the filler pipe and to engage the inner walls of the enlarged portion, said vent tube having an outside diameter smaller than the inside diameter of the filler pipe and the said flanges and spring arms holding the inlet device spaced from the inner surfaces of the enlarged portion of the filler pipe to define a vent space.

GEORGE W. EMMERT.